G. W. & F. P. MURPHEY.
Check-Rowers for Corn-Planters.
No. 221,089. Patented Oct. 28, 1879.
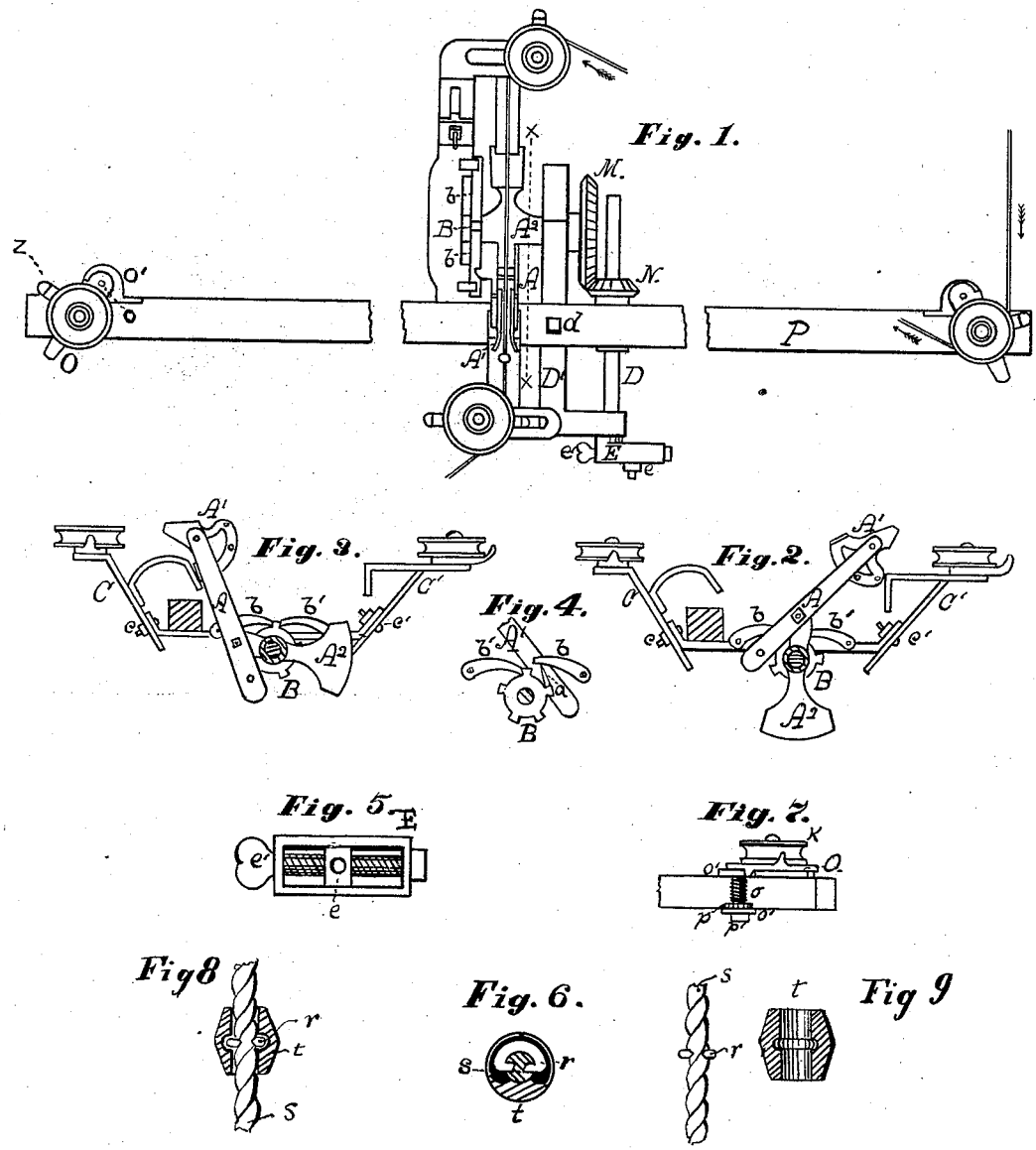
Witnesses
J. S. Dempsey
C. F. Chapman
Inventors
George W. Murphey
Frank P. Murphey
By Levi P. Abraham, atty

UNITED STATES PATENT OFFICE.

GEORGE W. MURPHEY AND FRANK P. MURPHEY, OF MACON COUNTY, ILL.

IMPROVEMENT IN CHECK-ROWERS FOR CORN-PLANTERS.

Specification forming part of Letters Patent No. 221,089, dated October 28, 1879; application filed February 14, 1879.

*To all whom it may concern:*

Be it known that we, GEORGE W. MURPHEY and FRANK P. MURPHEY, residents of the county of Macon and State of Illinois, have invented certain new and useful Improvements in Check-Rowers for Corn-Planters, of which the following is a full, clear, and exact description.

Our invention relates to that class of check-rowers in which the dropping mechanism is operated by knots or stops on a cord; and it consists, first, in a peculiar arranged and constructed vibrating tappet, A A′ A² a; second, in an arrangement of pawls on a ratchet by means of which the vibrating motion of the tappet is converted into intermittent rotary motion, B b b′; third, in a device for regulating the length of the tappet for the purpose of accommodating different strokes in planters and different speed in teams C c C′ c′, and extra bolt-holes in bar A; fourth, in a device for adjusting the position of arm E relative to the check-row bar D D′ d; fifth, in the construction of said arm, Figure 5; sixth, in a device for testing the tension of the cord, Fig. 7, and extremities of bar in Fig. 1; and, seventh, in the stop used on the cord, Fig. 6.

In the drawings, Fig. 1 is a plan of check-rower showing the relation of parts just as a stroke is being finished, the tappet being in position shown in Fig. 3. Figs. 2 and 3 are elevations of the tappet and accessories on the sectional line $x$ $x$, Fig. 1, showing the extreme positions, Fig. 2 before the stroke is commenced and Fig. 3 after it is finished. Fig. 4 is an opposite sectional view of ratchet B, showing the operation of catch a on pawl b. Fig. 5 is an enlarged end view of arm E. Fig. 6 shows the stop on the cord; Fig. 7, the tension-testing device, and Figs. 8 and 9 show details of the stop.

As the planter moves across the field the cord passes around the pulleys in the direction of the arrows, and the stop coming in contact with the end A′ of the tappet, as shown in Fig. 2, throws it in the position shown in Fig. 3, and passes on when weight A² carries the tappet back into the first position.

As the stroke is made catch a in Fig. 4 carries the ratchet one-fifth around, when pawls b b′ drop into the position shown in Fig. 3, thus locking the ratchet, and through it gear-wheel M, they (ratchet and gear-wheel) being rigid on the same shaft, while the tappet working loosely on said shaft drops back.

The proportions of wheels M and N are such that a one-fifth revolution in M produces a one-half revolution in N, so that arm E makes a full stroke at each vibration of the tappet. The connection between arm E and the seed-slides of the planter is made by means of a rod extending from projection e.

Wheel N has its bearing in the check-row bar, and is so constructed that square bar D moves loosely through it in the direction of its length. The distance of arm E from the bar is regulated by sliding D D′ in or out and securing by nut d.

The stroke of arm E is regulated by turning thumb-screw e′, enlarging or diminishing the circle described by e.

The tension device shown in Fig. 7 is an elevation from position $z$ in Fig. 1, and is constructed as follows: O is a plate carrying pulley K, and pivoting with shaft o in frame o′ and ratchet p. p is a ratchet extending below frame o′ in p′, and, besides acting as a bearing for shaft o, provides a place of attachment for one end of the spring that surrounds it. The upper end of the spring is attached to the shaft o, and its tension is regulated by turning the ratchet, a small pawl holding it in position.

The stop, Fig. 6, consists in a wire-blank, r, closed in the cord s, and a metal stop, t, provided with a groove adapted to fit around the wire closed around the same.

The wire r is bent so that points are formed, which are pressed into the cord. The metal stop is bent around the edge of the wire, so as to secure it to the same.

Having thus described our invention, we claim—

1. The vibrating tappet herein described, consisting of arm A, weight A², rocking catch A′, and catch a, in combination, substantially as shown and described.

2. Ratchet B, and pawls b b′, in combination with catch a on arm A′, substantially as herein described.

3. Plates C C′, arranged to be raised or lowered by means of bolts c c′, in combination with the adjustable tappet herein described, all to be used for the purpose of regulating the length of said tappet, for the purpose hereinbefore set forth.

4. Bar D, and slide D', in combination with bar P, and screw $d$, arranged and constructed to adjust the position of arm E, relative to bar P, substantially as herein set forth.

5. Arm E, adapted to have circular motion provided with thumb-screw $e'$ and projection $e$, all acting in combination, for the purpose of regulating the stroke of said arm, substantially as herein set forth.

6. The combination, in a device for regulating and testing the tension of the check-row cord, of plate O, pulley K, ratchet $p$, frame or support $o'$, and shaft $o$, with its tension-spring, substantially as herein described.

7. In a stop for a check-row cord, wire $r$, and stop $t$, in combination, substantially as shown and described.

GEORGE W. MURPHEY.
FRANK P. MURPHEY.

Witnesses:
LEVI P. GRAHAM,
H. A. PALMER.